United States Patent [19]

Loigerot

[11] 4,414,876
[45] Nov. 15, 1983

[54] CHAIN SAW FOR TREE CUTTING PINION TO BE USED IN COMBINATION WITH THE CHAIN, AND PROCESS FOR MAKING THE CHAIN

[75] Inventor: Jean Loigerot, Paris, France

[73] Assignee: Association pour la Rationalisation et la Mecanisation de l'Exploitation Forestiere, Paris, France

[21] Appl. No.: 241,860

[22] Filed: Mar. 9, 1981

[30] Foreign Application Priority Data

Mar. 14, 1980 [FR] France ............................. 80 05774

[51] Int. Cl.³ .......................................... B27B 33/14
[52] U.S. Cl. ....................................... 83/830; 83/831; 83/832; 30/381; 145/31 R
[58] Field of Search ................. 83/830, 831, 832, 833, 83/834; 30/381; 145/31 R

[56] References Cited

U.S. PATENT DOCUMENTS

| 1,004,245 | 9/1911 | Crouch | 83/832 |
| 1,763,095 | 6/1930 | De Haven | 83/832 |
| 3,123,110 | 3/1964 | Keway | 83/832 |
| 3,360,022 | 12/1967 | Stihl et al. | 83/830 |
| 4,218,820 | 8/1980 | Cleva | 30/381 |

Primary Examiner—Donald Schran
Attorney, Agent, or Firm—Brisebois & Kruger

[57] ABSTRACT

The invention concerns a chain saw for a tree cutting device.

This chain is composed of cutting links (2) having two cutting teeth (6) located on either side of the longitudinal axis of the chain, one of the teeth being basically in the plane of the chain and the other tooth being displaced with respect to the plane of the chain, and the cutting links being so placed that the chain presents, on either side of its longitudinal axis, successively, a tooth displaced on one side of its plane, a tooth in its plane, a tooth displaced on the other side of its plane, a tooth in its plane, and so forth.

7 Claims, 8 Drawing Figures

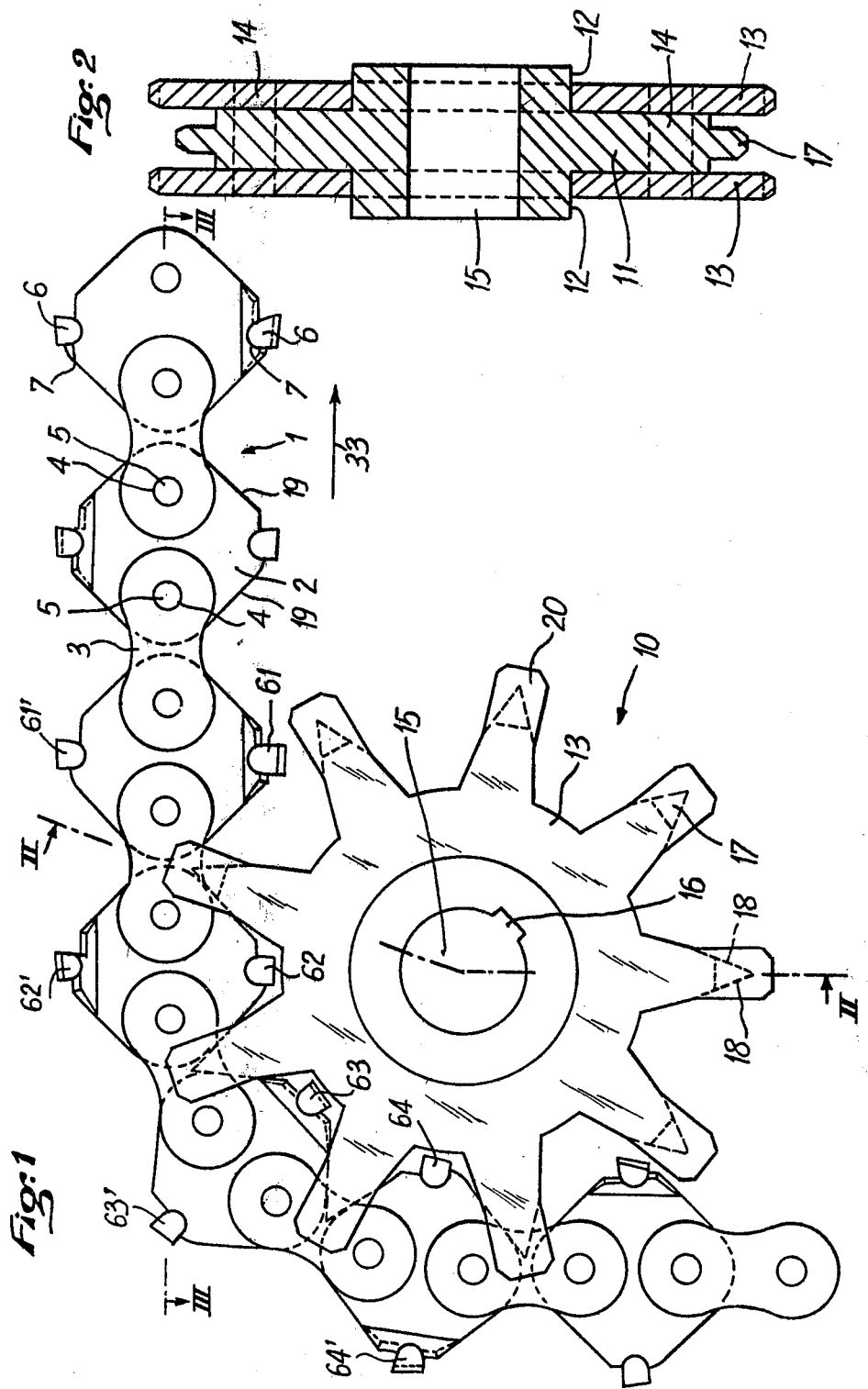

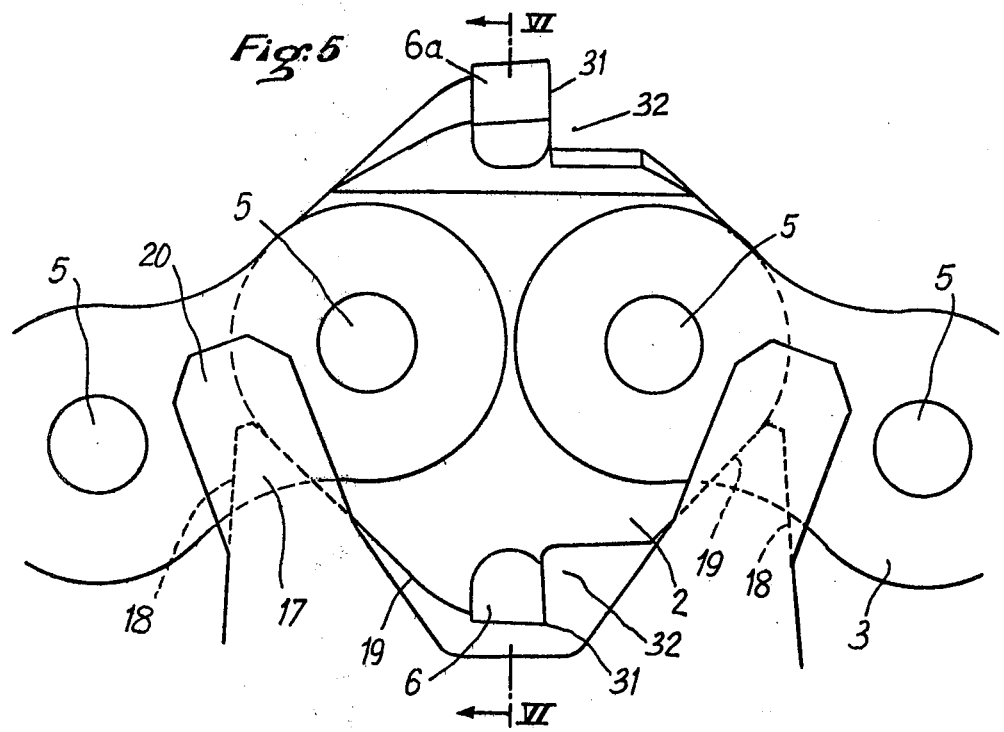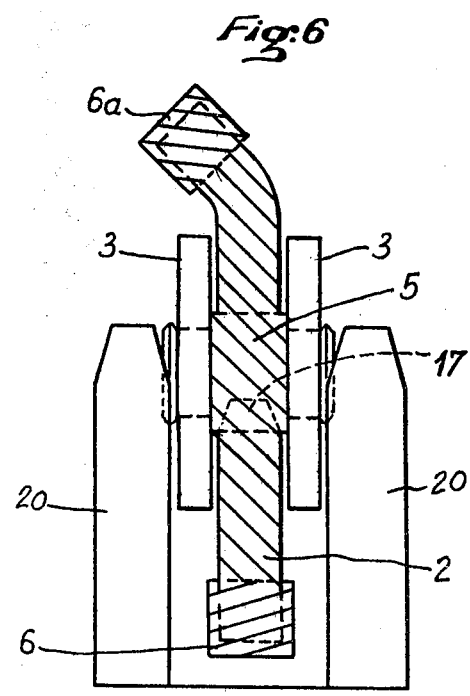

CHAIN SAW FOR TREE CUTTING PINION TO BE USED IN COMBINATION WITH THE CHAIN, AND PROCESS FOR MAKING THE CHAIN

The present invention has as its object a chain saw for a tree cutting device.

Such devices are known in which a chain without a guide bar is mounted on a mobile cutting frame by means of pulleys ensuring the support and tension of the chain. One of the pulleys is replaced by a pinion connected to a motor to ensure the driving of the chain.

These devices are also generally provided with gripping systems allowing the tree to be firmly seized before the cut is made by displacement of the cutting frame. However, if it happens that the tree slides down after it has been sawed it is impossible to return the cutting frame to its original position since the tree is found to be between the cutting strand of the chain and its return strand.

The present invention aims at providing a chain saw which eliminates this disadvantage because it is able to saw equally well from either side of its longitudinal axis, that is, from either the inside or the outside of the cutting frame.

For this purpose, the present invention has as its object a chain saw for a tree cutting device, characterized by the fact that it is composed of cutting links comprised of two cutting teeth placed on either side of the longitudinal axis of the chain, one of the teeth being basically in the plane of the chain and the other tooth being displaced with respect to the plane of the chain, and the cutting links being so disposed that the chain presents, on each side of its longitudinal axis, successively, a tooth displaced to one side of its plane, a tooth in its plane, a tooth displaced to the other side of its plane, a tooth in its plane, and so forth.

In one preferred embodiment of the invention, the cutting links are basically square in plane, with one of their diagonals positioned essentially along the longitudinal axis of the chain and their cutting teeth disposed at the corners located on either side of this diagonal.

This arrangement allows in particular for the manufacture of cutting links identical to each other prior to their sharpening and consequently ensures their interchangeability. The chain is thus, also reversible, that is, it can then be sharpened or set in one direction or the other.

Advantageously, the cutting links are made from a metal plate of which one of the corners on which are placed the cutting teeth is bent to displace the corresponding tooth with respect to the plane of the chain.

Each of the corners on which the cutting teeth are place can have a seat in which is mounted, for example by brazing, a small plate of a hard material such as tungsten carbide.

In one particular embodiment of the invention, the cutting links are connected side by side by connecting links.

The present invention also has as its object a pinion able to be used in combination with a chain saw such as that described above, characterized by the fact that it has a toothed wheel able to coact with the cutting links and two lateral guide plates on either side of the toothed wheel to guide the chain, the lateral plates having grooves for the passage of the displaced teeth of the cutting links.

The present invention also has as its object a process for manufacturing a chain saw such as that described above, this manufacturing process being characterized by the fact that a number of identical blanks are made, each provided with two seats, that there is placed in each seat a small plate of a hard material such as tungsten carbide, the small plates all being identical to each other, that the blanks are interconnected to form a chain, and that this chain is sharpened.

Other characteristics and advantages of the present invention will appear in the following description of one of its embodiments given by way of non-limiting example.

On the attached drawings:

FIG. 1 is a front view of a portion of a chain saw and of a pinion according to the present invention in engaging position;

FIG. 2 is a view in section along line II—II of FIG. 1;

FIG. 5 is a front view on a larger scale showing a portion of the chain engaged with the pinion;

FIG. 6 is a view in section along line VI—VI of FIG. 5;

Figure 3:
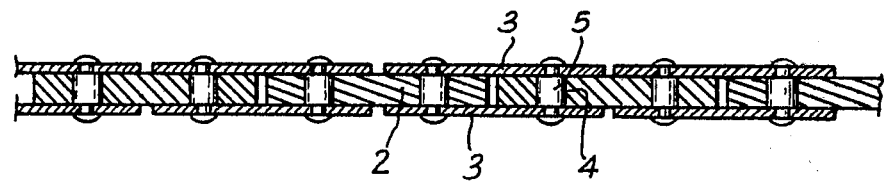
FIG. 3 is a view in section along the line III—III of FIG. 1.
Figure 4:
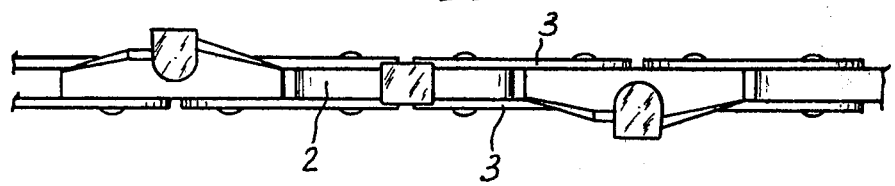
FIG. 4 is a top view of the chain shown on FIG. 1.

Chain 1 shown in particular at FIGS. 1, 3 and 4 comprises essentially a succession of alternate cutting links 2 and connecting links 3.

Cutting links 2 are made as will be described later of a metallic plate provided with two openings 4, for the passage of pins 5 for connection with connecting links 3. Links 3 are each in the form of two half-links comprised of metal plates having axial openings for the passage of the connecting pins 5. Every two cutting links 2 are connected by a connecting link 3 whose two half-links are placed on either side of the cutting links 2. As may be seen more clearly at FIG. 6, pins 5 are shouldered and fixed to the assembly of connecting links by riveting so that the links are articulated to each other.

As will be seen at FIG. 1, cutting links 2 are generally square in plan with rounded corners. Openings 4 for the connecting pins 5 have their centers on one of the diagonals of the square so that this diagonal is disposed along the longitudinal axis of chain 1. At the corners on either side of this diagonal, small plates 6 of tungsten carbide are brazed in seats 7 to form the cutting teeth.

As is clearly apparent from FIG. 6, one of the corners of cutting link 2, provided with a small plate 6, is bent so that the cutting tooth formed by the corresponding small plate 6a is shifted with respect to the plane of chain 1. As is shown at FIG. 1, cutting links 2 are so disposed that chain saw 1 presents on the interior side of its longitudinal axis a succession of cutting teeth formed of a tooth 61 displaced toward the front of the plane of the chain (that is, toward the front of the plane of the drawing), a tooth 62 in its plane, a tooth 63 displaced toward the back of its plane, another tooth 64 placed in its plane, and so forth. In the same way, chain saw 1 presents at the exterior side of its longitudinal axis a succession of cutting teeth formed of a tooth 61' disposed in the plane of the chain, a tooth 62' displaced toward the front, another tooth 63' disposed in its plane, a tooth 64' displaced toward the back, and so forth.

Driving pinion 10 shown in particular at FIGS. 1 and 2 of the drawings, is formed of a central toothed wheel 11 provided on either side of its plane of symmetry with shoulders 12 on which are mounted lateral guide plates 13. Toothed wheel 11 and the wheel plates 13 are fixed together by riveting. Openings 14 are made for this purpose for the passage of the rivets, and also there is a central opening 15 provided with a seat 16 for a key to connect the drive pinion 10 to the output shaft of a motor.

The central toothed wheel 11 is provided with teeth 17 whose flanks 18 come into contact with surfaces 19 of cutting links 2 when chain 1 engages with pinion 10.

The guiding of the chain is ensured by the lateral plates 13 which have extensions 20 which come to bear on the exterior faces of connecting links 3 between two consecutive rivets 5 as can be seen in particular at FIGS. 5 and 6. Between the extensions 20, lateral plates 14 form grooves allowing the passage of the displaced cutting teeth 6a of cutting links 2.

Figure 7:
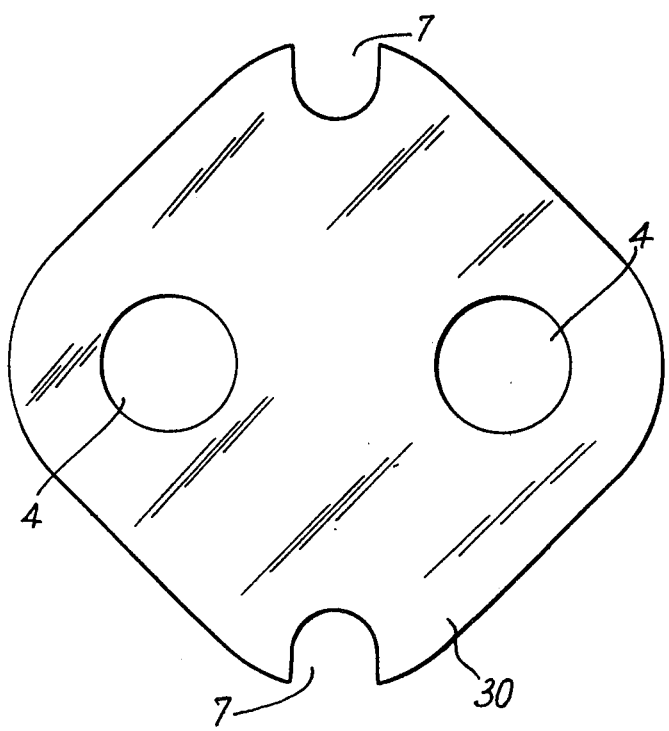
FIG. 7 is a front view of a blank for the cutting links.
Figure 8:
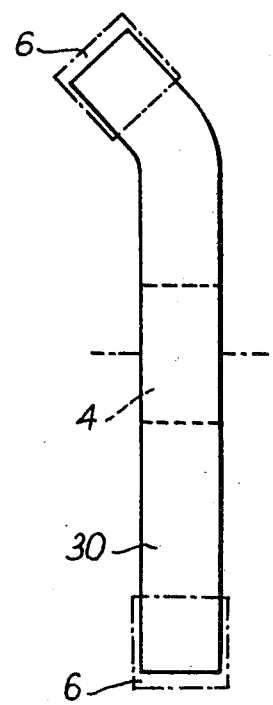
FIG. 8 is a side view corresponding to FIG. 7.

Cutting links 2 are preferably made as is shown in FIGS. 7 and 8.

A metal plate 30 is first cut, for example by stamping, to present the shape in plan shown at FIG. 7. This plate 30 is basically in the shape of a square with rounded corners. In this square are made, openings 4 for the passage of the articulation pins 5, and also the seats 7 for the small tungsten carbide plates.

One of the corners of plate 30 comprising a seat 7 is then bent as shown at FIG. 8. In the embodiment shown, the bent corner forms an angle of about 45° with the rest of plate 30.

Small tungsten carbide plates 6 are then brazed in seats 7 after which chain 1 can be assembled.

It will be understood, as a result, that the assembly of chain 1 is effected with links which are all identical, both in respect to metal plate 30 and small tungsten carbide plates 6. Moreover, the two small plates 6 of each link are identical.

The chain is then sharpened to take the shape shown more particularly at FIGS. 1 and 5. This operation has the effect of forming cutting edge 31 on the small tungsten carbide plates 6 (FIG. 5) while at the same time cutting recesses in metal plates 30 which give them their definitive shape. During this sharpening operation, the two cutting edges 31 of the small tungsten carbide plates are formed on the same side of the small plates with respect to a transverse plane so that the cutting direction is the same for the side of the chain on the inside or the outside of its longitudinal axis, that is, in the direction of arrow 33 on FIG. 1.

Consequently, it will be noted that the invention furnishes a chain which is not only able to cut from both sides of a single strand, that is during both the return and forward movements of the sawing frame of the device on which it is mounted, but which is also made from identical cutting links. Moreover, these links may be sharpened or set in either direction which ensures the reversibility of the chain.

I claim:

1. A guideless saw chain for a tree cutting device without a guide bar, for sawing from either side of the longitudinal axis of the chain, said saw chain comprising, a series of cutting links, means pivotally connecting the cutting links together to form an endless chain having a plane extending through the series of cutting links, each of said cutting links comprising, a first tooth on one side of said longitudinal axis and a second tooth on the other side of said longitudinal axis, said cutting links being so connected in series that the chain has, on each side of its longitudinal axis, successively, a tooth displaced to one side of said plane, a tooth in said plane, a tooth displaced to the other side of said plane, a tooth in said plane, and so forth, along substantially the entire length of the chain.

2. A guideless saw chain according to claim 1 wherein each cutting link of said chain comprises a first tooth substantially in said plane, and a second tooth displaced to one side of said plane.

3. A guideless saw chain according to claim 1 wherein each cutting link comprises only said first and second teeth.

4. A guideless saw chain according to claim 1 wherein each cutting link is essentially square in plan, with one diagonal of the square disposed essentially on the longitudinal axis of the chain, and the cutting teeth disposed at corners of the square situated on either side of this diagonal.

5. A guideless saw chain according to claim 4 wherein each cutting link comprises a metal plate of which one of the corners on which a cutting tooth is disposed, is bent to displace the tooth with respect to the plane of the chain.

6. A guideless saw chain according to claim 4 wherein each of the corners on which a cutting tooth is disposed has a seat, and each tooth comprises a tooth of tungsten carbide mounted on said seat.

7. A guideless saw chain according to claim 1 wherein said means pivotally connecting the cutting links together comprises connecting links, one between each adjacent cutting link.

* * * * *